(12) United States Patent
Danielou et al.

(10) Patent No.: US 11,548,470 B2
(45) Date of Patent: Jan. 10, 2023

(54) INFLATOR FOR A PASSIVE VEHICLE SAFETY DEVICE

(71) Applicants: AUTOLIV ASP, INC., Ogden, UT (US); AUTOLIV DEVELOPMENT AB, Vargarda (SE)

(72) Inventors: Romain Danielou, Bountiful, UT (US); Matthew A. Cox, Centerville, UT (US); Kevin Smith, Bountiful, UT (US); Ludovic Pogeant, Quimper (FR); Jean Champendal, Quimper (FR); Ludovic Cueff, Pleyben (FR); Dominique Louboutin, Ergue-Gaberic (FR); Laurent Mazeas, Pluguffan (FR); Sebastien Delacroix, Loperhet (FR); Gildas Clech, Plougastel-Daoulas (FR)

(73) Assignee: Autoliv ASP, Inc., Ogden, UT (US)

( * ) Notice: Subject to any disclaimer, the term of this patent is extended or adjusted under 35 U.S.C. 154(b) by 212 days.

(21) Appl. No.: 17/130,111

(22) Filed: Dec. 22, 2020

(65) Prior Publication Data
US 2022/0194314 A1 Jun. 23, 2022

(51) Int. Cl.
*B60R 21/26* (2011.01)
*B01D 46/00* (2022.01)
*B01D 46/24* (2006.01)

(52) U.S. Cl.
CPC ............ *B60R 21/26* (2013.01); *B01D 46/001* (2013.01); *B01D 46/0041* (2013.01); *B01D 46/2403* (2013.01); *B01D 2265/02* (2013.01); *B01D 2279/10* (2013.01); *B60R 2021/26011* (2013.01)

(58) Field of Classification Search
None
See application file for complete search history.

(56) References Cited

U.S. PATENT DOCUMENTS

| 10,974,687 | B2 * | 4/2021 | Fukui | B60R 21/2644 |
| 11,273,787 | B2 * | 3/2022 | Cox | B60R 21/26 |
| 2019/0184931 | A1 * | 6/2019 | Prima | F42B 3/04 |
| 2021/0394701 | A1 * | 12/2021 | Cox | B60R 21/26 |
| 2021/0394703 | A1 * | 12/2021 | Cox | B60R 21/264 |

FOREIGN PATENT DOCUMENTS

| EP | 0012627 A2 | 6/1980 | |
| WO | WO-2009043904 A2 * | 4/2009 | ......... B60R 21/2644 |
| WO | 2018002166 A1 | 1/2018 | |
| WO | WO-2018088134 A1 * | 5/2018 | ........... B60R 21/263 |
| WO | 2019120591 A1 | 6/2019 | |

OTHER PUBLICATIONS

International Search Report and Written Opinion regarding International Application No. PCT/US2021/064042, dated Apr. 19, 2022.

* cited by examiner

*Primary Examiner* — Faye M Fleming
(74) *Attorney, Agent, or Firm* — Harness, Dickey & Pierce, P.L.C.; Stephen T. Olson

(57) ABSTRACT

An inflator for generating inflation gases for a safety device includes a housing having an internal cavity including a combustion chamber and a filter chamber. A filter is disposed in the filter chamber. A separating member is disposed in the housing on a first axial side of the filter and separates the filter chamber from the combustion chamber. An insulating member is disposed in the filter chamber on a second axial side of the filter. The second axial side is opposite the first axial side. The separating member is coupled to the insulating member.

20 Claims, 7 Drawing Sheets

INFLATOR FOR A PASSIVE VEHICLE SAFETY DEVICE

FIELD

The present disclosure generally concerns an inflator to provide inflation gases for a passive vehicle safety device, such as an inflatable airbag. More particularly, the present disclosure relates to an inflator for a passive vehicle safety device with an insulating member on a first axial side of a filter coupled to a separating member on a second, opposite axial side of the filter.

BACKGROUND

This section provides background information related to the present disclosure which is not necessarily prior art.

Inflatable occupant restraints or airbags are commonly included on motor vehicles. In the event of an accident, a sensor within the vehicle measures abnormal deceleration, for example, and triggers inflation of the airbag within a few milliseconds with gas produced by a device commonly referred to as an "inflator". The inflated airbag cushions the vehicle occupant from impact forces.

Inflators may commonly have one or more chambers containing gas generant materials. Adaptive pyrotechnic inflators having gas generant materials in two chambers, which are independently activated by two ignition devices commonly referred to as "dual stage" inflators. In practice, each such gas generant material-containing chamber may be referred to as a "combustion chamber" as the gas generant material therein is combusted or otherwise reacted to produce gas used to inflate an associated occupant restraint.

One known inflator is shown and described in commonly assigned U.S. Pat. No. 7,950,693. The inflator is a dual stage inflator device including a housing defining first and second chambers each containing a quantity of gas generant combustible to produce inflation gases. U.S. Pat. No. 7,950,693 is incorporated by reference as if fully set forth herein.

While known inflators for inflatable occupant restraints, including the inflator of U.S. Pat. No. 7,950,693, have generally proven to be suitable for their intended uses, a continuous need for improvement in the relevant art remains.

SUMMARY

This section provides a general summary of the disclosure, and is not a comprehensive disclosure of its full scope or all of its features.

In accordance with one particular aspect, the present teachings provide an inflator for generating inflation gases for a safety device. The inflator includes a housing having an internal cavity including a combustion chamber and a filter chamber. A filter is disposed in the filter chamber. A separating member is disposed in the housing on a first axial side of the filter and separates the filter chamber from the combustion chamber. An insulating member is disposed in the filter chamber on a second axial side of the filter. The second axial side is opposite the first axial side. The separating member is coupled to the insulating member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
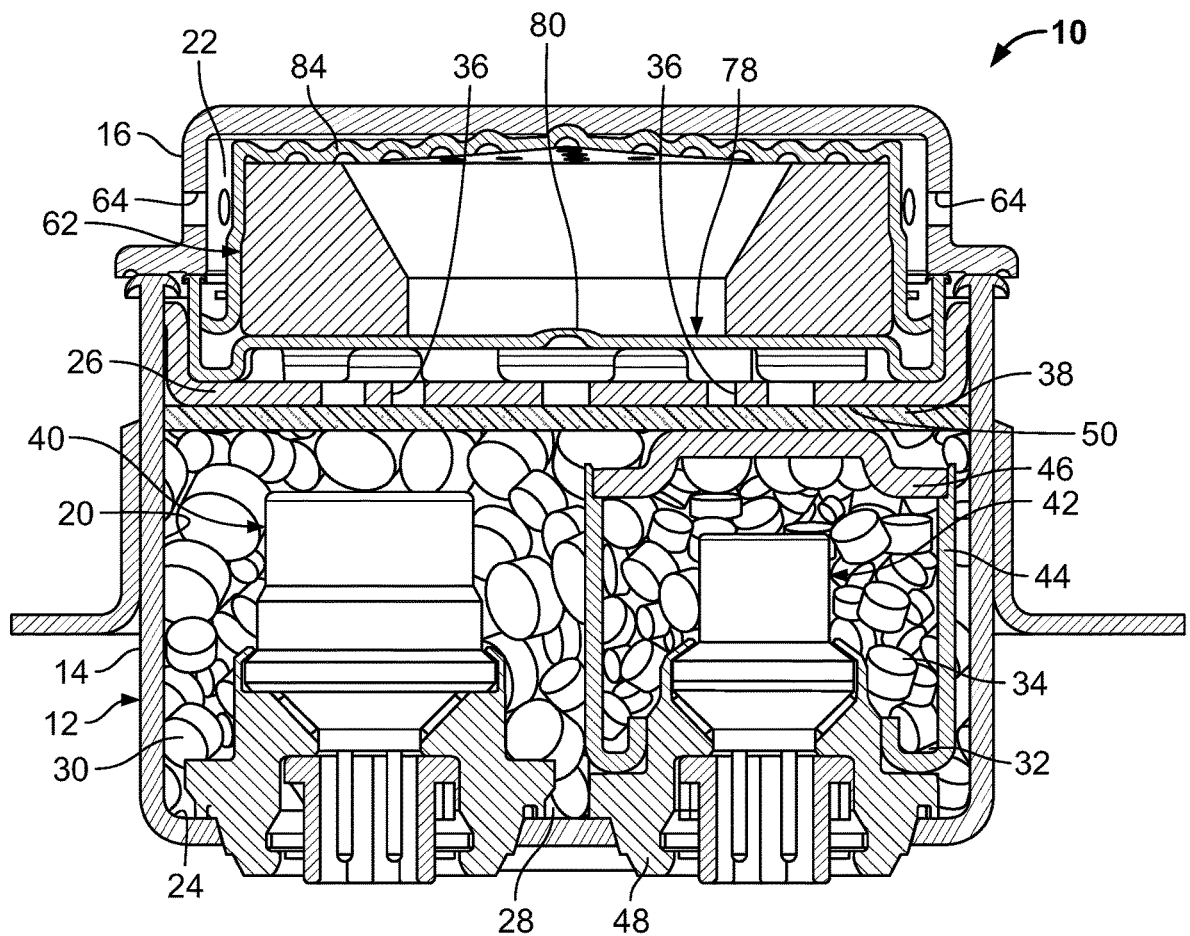
FIG. 1 is a cross-sectional view of an inflator for an inflatable occupant restraint in accordance with the present teachings, the inflator shown prior to activation.

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance, and does not necessarily mean special or preferred.

With reference to drawings, an inflator for an inflatable occupant protection device in accordance with the present teachings is illustrated and generally identified at reference character 10. The inflator 10 is part of an occupant restraint system of a motor vehicle that includes an inflatable airbag (not particularly shown). The inflator 10 shown in the drawings is a dual-stage inflator particularly adapted for a driver side front airbag. It will be understood, however, that various aspects of the present teachings may be readily adapted for use with passenger side front airbags and other airbags.

The inflator 10 is generally illustrated to include housing 12 having a first housing portion 14 and a second housing portion 16. In the embodiment illustrated, the housing 12 has a generally circular cross section. The first housing portion 14 may be inertia welded or otherwise suitably attached to the second housing portion 16. The first and second housing portions 14 and 16 cooperate to define an internal cavity 20 having a filter chamber 22 separated from a combustion chamber 24 by an internal wall 26.

The combustion chamber 24 includes a first portion or first combustion chamber portion 28 containing a first gas generant material 30. The combustion chamber 24 further includes a second portion or second combustion chamber portion 32 containing a second gas generant material 34. Insofar as the present teachings are concerned, the first and second gas generant materials 30 and 34 may be the same material or may be different materials.

The internal wall may be a vented wall or gas generant retaining wall 26 for retaining the first and second gas generant materials 30 and 34 within the combustion chamber 24. The gas generant retaining wall 26 includes a plurality of openings 36 for venting combustion gases from the combustion chamber 24 to the filter chamber 22. A foam disc 38 may be disposed in the combustion chamber 24 adjacent to the gas generant retaining wall 26. As will be understood by those skilled in the art, the foam disc conventionally functions to provide stability to the storage of the first and second gas generant materials 30 and 34 which may settle within the combustion chamber 24 over time. The foam disc may be consumed upon combustion of the first and second gas generant materials 30 and 34.

A first stage ignition device 40 is disposed in the first portion 28 of the combustion chamber 24 for combusting the first gas generant material 30. A second stage ignition device 42 is correspondingly disposed in the second portion 32 of the combustion chamber 24 for combusting the second gas generant material 34. The first and second stage ignition devices 40 and 42 will be understood to be conventional in construction and operation insofar as the present teachings are concerned. The first and second stage ignition devices 40 and 42 may be conventional mounted to or mated with the housing 12.

The second portion 32 of the combustion chamber 24 is defined by one or more sidewalls 44 and a lid 46. In the embodiment illustrated, the one or more sidewalls includes a single, continuous wall or chamber wall 44. The wall 44 may be oval, circular or of any other cross-sectional shape. At a first end (the lower end as shown in the drawings) of the chamber wall 44, the chamber wall 44 receives the second stage ignition device 42 and a base 48 of the second stage ignition device 42 closes the first end. At a second or opposite end (the upper end as shown in the drawings) of the chamber wall 44, the lid 46 normally (i.e., prior to activation of the inflator 10) closes the second portion 32 of the combustion chamber 24. The lid 46 may be oval in shape or otherwise cooperatively configured with the chamber wall 44 to close the second portion 32 of the combustion chamber 24.

The lid 46 is movable in an axial direction from a first or closed position prior to combustion of the gas generant materials to a second or open position following combustion of the gas generant materials. The inflator 10 is shown prior to combustion of the gas generant materials 30 and 34 in FIG. 1 and after combustion of the gas generant materials 30 and 34 in FIG. 1. Explaining further, prior to combustion of the second gas generant material 34 (as shown in the cross-sectional view of FIG. 1), the lid 46 is axially spaced from the generant retaining wall 26. As illustrated, the lid 46 may be spaced from the generant retaining wall 26 by the foam disk 38. Upon combustion of the second gas generant material 34 (as shown in the cross-sectional view of FIG. 1A), the foam disk 38 is consumed by the heat of the reaction and the lid 46 is axially displaced (upward as shown in the drawings) to a position adjacent to the generant retaining wall 26 in response to an increase of pressure within the second portion 32 of the combustion chamber 24.

An outer side 50 of the lid 46 and an adjacent side 52 of the generant retaining wall 26 may be cooperatively configured to allow an improved flow of combustion gas between the gas generant retaining wall 26 and the lid 46 when the lid abuts the gas generant retaining wall 26 in the open position. In this regard, at least one of the outer side 50 of the lid and the adjacent side 52 of the gas generant retaining wall 26 includes a planar portion 54 and a raised portion 56. In the embodiment illustrated, the lid 46 includes the planar portion and the raised portion 56 and the adjacent side 52. The raised portion may be stamped into the lid 46 or otherwise formed with or into the lid 46, and may outwardly extend from the planar portion 54 in a direction away from the second portion 32 of the combustion chamber 24.

The raised portion 56 of the lid 46 is configured to cooperate with the gas generant retaining wall 26 and maintain a generally parallel orientation between the gas generant retaining wall 26 and the planar portion 54 of the lid 46 when the lid 46 is in the open position and abutting the gas generant retaining wall 26. To this end, the raised portion 56 includes at least three spaced apart points defining a plane perpendicular to an axial direction that abut the gas generant retaining wall 26 to maintain the generally parallel orientation. Perhaps more preferably, the raised portion 56 includes at least three legs 58 each outwardly extending from a common point 60 in a direction parallel to the gas generant retaining wall 26. In the embodiment illustrated, the raised portion has a cruciform shape with four legs 58 each outwardly extending from the common point 60 in the direction parallel to the gas generant retaining wall 26. Each of the legs 58 may have a generally convex shape. It will be appreciated that the legs 58 of the raised portion 56 may alternatively be spaced from each other (i.e., not connected to one another through a common point 60).

At least one of the gas generant retaining wall 26 and the raised portion 56 of the lid 46 may be constructed of a material that partially deforms upon movement of the lid 46 from the first position to the second position under the heat and pressure of the reaction. This partial deformation may increase surface area contact between the lid 46 and the gas generant retaining wall 26 to avoiding tilting of the lid 46 while maintaining the combustion gas flow path therebetween. In one embodiment, the lid 46 may be constructed of carbon steel and the gas generant retaining wall may similarly be constructed of carbon steel.

A filter 62 is disposed in the filter chamber 22 for filtering combustion gases before the combustion gases are exhausted through radially extending ports 64 in the second portion 16 of the housing 12. The second portion 16 of the housing 12 may be a diffuser cap portion. The filter 62 includes a main body 66 and an opening 68 that axially passes through the main body 66. The opening 68 has a first end 70 at a first axial side 72 of the main body portion 66 and a second end 74 at a second axial side 76 of the main body portion 66. The first end 70 of the opening 68 has a first diameter $D_1$. The second end 74 has a second diameter $D_2$. The second diameter $D_2$ is greater than the first diameter $D_1$.

The opening 68 includes a first axially extending portion 68A inwardly extending into the main body portion 66 from the first axial side 72 and a second axially extending portion 68B inwardly extending into the main body portion 66 from the second axial side 76. The first axially extending portion 68A may have a cylindrical shape. The second axially extending portion 68B may have a frustoconical shape. The frustoconical shape of the second axially extending portion 68B may outwardly taper from the first diameter $D_1$ adjacent the first axially extending portion 68A to the second diameter $D_2$ at the second end 74. The second axially extending portion 68A may outwardly taper at an angle α.

In one particular application, the first axially extending portion 68A has a first height $H_1$ of approximately 3.5 mm, the second extending portion 68B has a second height $H_2$ of approximately 7.2 mm, and the second axially extending portion 68A outwardly tapers at an angle between 45 degrees and 70 degrees, and more preferably at an angle of approximately 60 degrees. In this particular example, the first diameter $D_1$ of the first end 70 of the opening 68 is approximately 19.5 mm and the second diameter $D_2$ of the second end 74 of the opening 68 is approximately 27.8 mm.

The opening 68 of the filter 62 may alternatively include a stepped shape. In this regard, the opening 68 may be alternatively defined by one or more cylindrical portions of different diameters. For example, the second axially extending portion 68B of the opening 68 may alternatively be cylindrically shaped with a stepped portion between the first and second axially extending portions 68A and 68B.

The filter 62 may include a first filter portion 62A radially surrounding the first axially extending portion 68A and a second filter portion 62B radially surrounding the second axially extending portion 68B. The first filter portion 62A may have a first radial density in a radial direction and the second filter portion may have a second radial density in the radial direction. The second radial density may be greater than the first radial density such that combustion gases more easily radially flow through the first filter portion 62A as compared to radially through the second filter portion 62B. The second filter portion 68B may have a variable density in the radial direction that increases from the first filter portion 62A to the second axial side 76 of the filter 62. The variable density of the second filter portion 68B may linearly increase from adjacent the first filter portion 62A to the second axial side 76 of the filter 62.

The filter 62 may be constructed of metal. More preferably, the filter may be a woven wire mesh filter. The frustoconical shape of the portion of the opening 68 passing through the second filter portion 62B may be defined by a correspondingly shaped mandrel. In this regard, a mandrel (not shown) used to create the frustoconical shape of the second axially extending portion 68B of the opening 68 may have a male frustoconical shape corresponding to the shape of the second axially extending portion 68B. The wire mesh filter 62 may be compressed from an initial, generally toroidal shape by the mandrel which is inserted into the opening 68. Compression of the wire mesh of the filter 62 with the mandrel may simultaneously axially compress the wire mesh of the first and second filter portions 62A and 62B and radially compress the wire mesh of the second filter portion 62B. Insofar as the wire mesh of the first filter portion 62A is not radially compressed (or at least radially compressed to a lesser degree), the density of the second filter portion 62B is greater than the density of the first filter portion 62A.

Figure 7A:
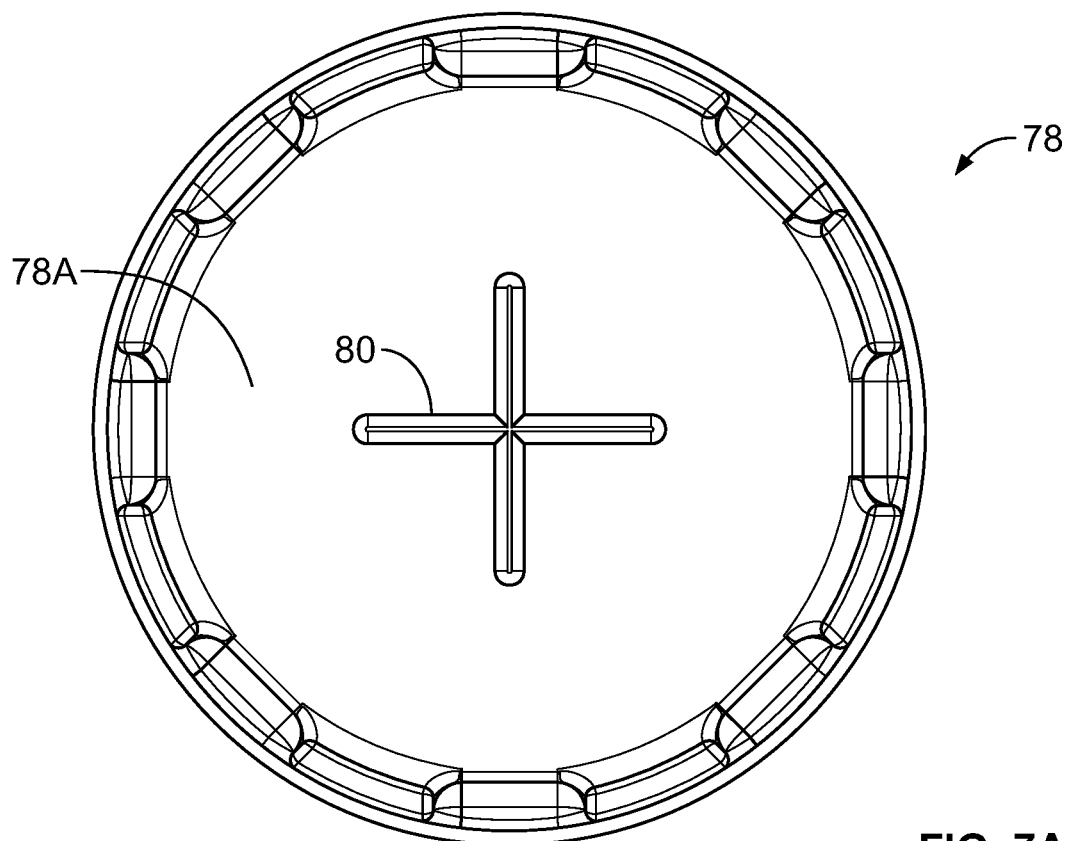
FIG. 7A is a top view of a separating member of the inflator of the present teachings, the separating member shown prior to activation of the inflator.
Figure 7B:
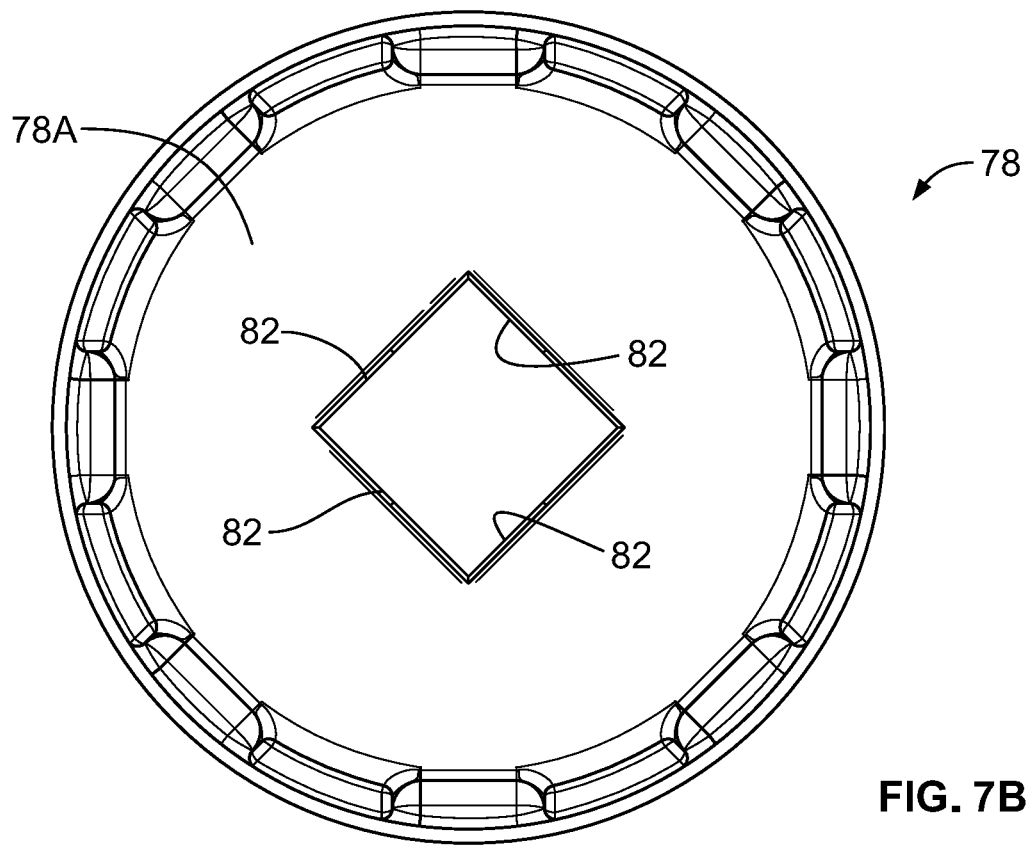
FIG. 7B is a top view similar to FIG. 7A, the separating member shown after activation of the inflator.
Figure 8:
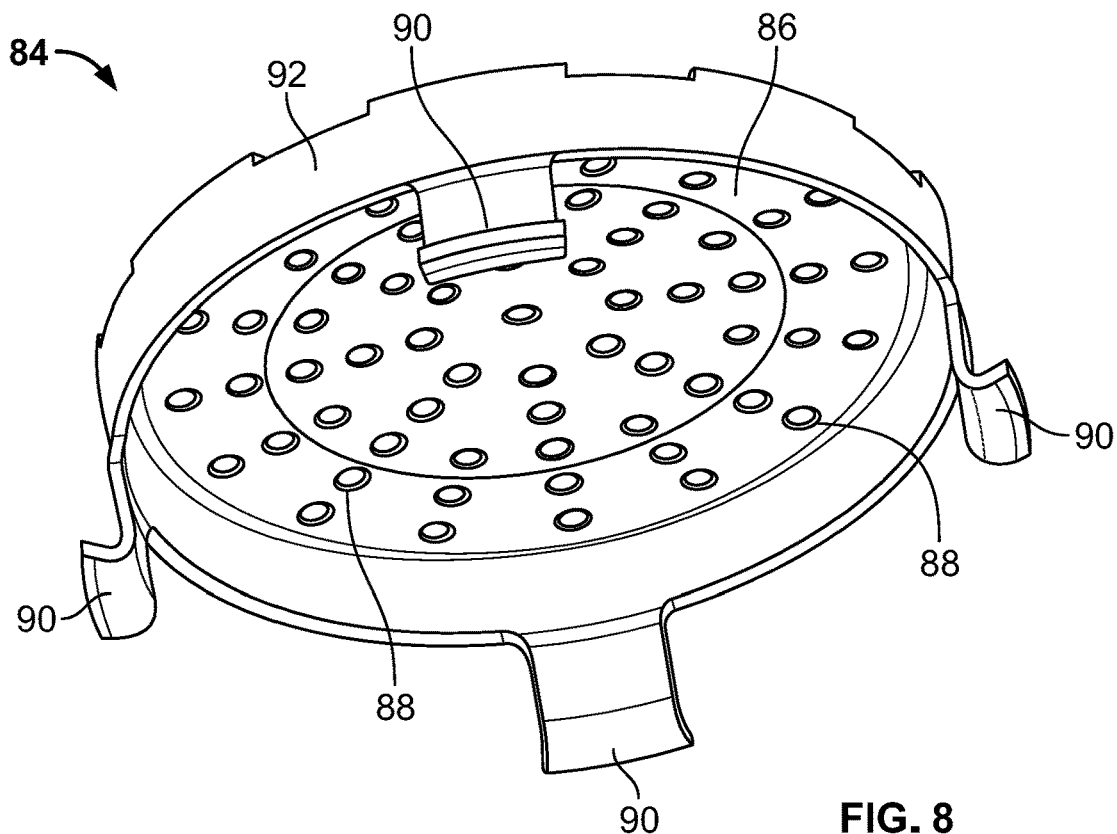
FIG. 8 is perspective view of an insulating member of the inflator of the present teachings.
Figure 9:
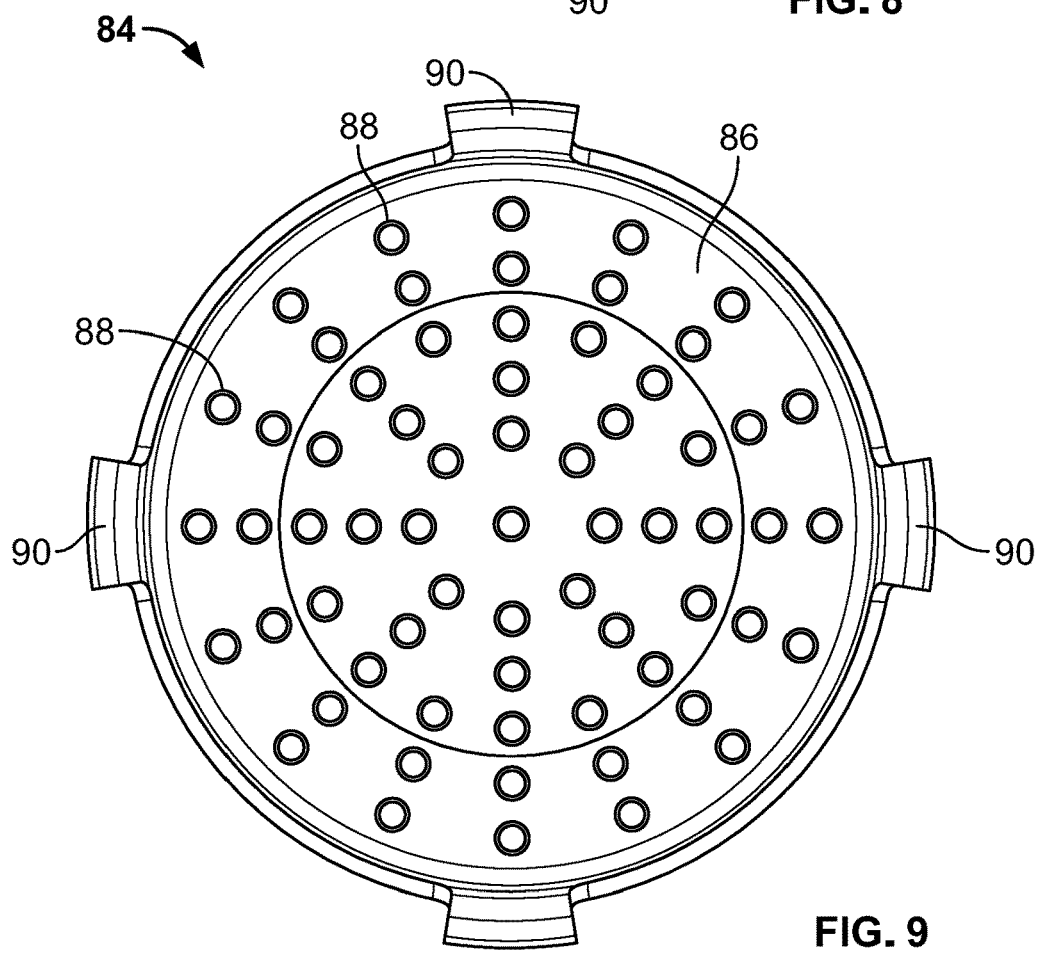
FIG. 9 is a bottom view of the insulating member of FIG. 9.

A separating member 78 disposed in the housing 12 axially separates the filter chamber 22 and the combustion chamber 24. The separating member 78 includes a plate portion 78A disposed adjacent the first axial side 72 of the filter 62. The plate portion 72A and may include a weakened zone 80. The weakened zone 80 may be adapted to open in response to an increase in pressure within the combustion chamber 24. The weakened zone 80 is shown prior to opening in FIGS. 1 and 7A. The weakened zone 80 is shown after opening in FIGS. 2 and 7B. In the embodiment illustrated, the weakened zone 80 has a cruciform shape. As such, the weakened zone 80 opens to define four petals 82. It will be understood, however, that alternately shaped weakened zones may be employed within the scope of the present teachings to define a greater or lesser number of petals 82. After the weakened zone 80 opens, a plurality of petals 82 of the plate portion 78A axially extend into the filter chamber 22. The first axially extending portion 68A of the filter 62 is sized and positioned to oppose radial movement of the plurality of petals 82 upon opening of the weakened zone 80. The petals 82 of the plate portion 78A are radially spaced from the second diameter of the second axially extending portion 68B of the opening 68 upon opening of the weakened zone.

An insulating member 84 is axially disposed between the filter 62 and the second housing portion 16. Combustion gases passing through the filter 62 elevate the temperature of the filter 62. The insulating member 84 includes a plate portion 86 including a plurality of vent holes 88. The insulating member 84 functions to protect the second housing portion 16 from these elevated filter temperatures. In the embodiment illustrated, the insulating member 84 is coupled to the separating member 78 such that the insulating member 84 is radially and axially captured by the separating member 78.

The separating member 78 and the insulating member 84 are cooperatively configured to be coupled together. In this regard, the separating member includes a circumferential flange axially extending from the plate portion 78A in a direction away from the combustion chamber 24. The insulating member 84 includes a plurality of engagement elements 90. The engagement elements 90 may be hook shaped engagement elements sized and positioned to be press-fit to the separating member 78. The hook shaped engagement elements 90 axially extend from a circumferential flange 92 that axially extends from the plate portion 86 of the insulating member 84. In the embodiment illustrated, the insulting member 84 includes four (4) engagement elements 90 equally spaced circumferentially about the insulating member. While the hook shaped engagement elements 90 may be preferred for particular applications, it will be understood that other types of engagement elements may be incorporated within the scope of the present teachings. It will also be understood that the engagement elements 90 may be alternatively carried by the separating member 78.

The filter 62 is axially captured between the insulating member 84 and the separating member 78 such that movement of the filter 62 within the filter chamber 22 is directly opposed in a first axial direction by the plate portion 86 of the insulating member 84 and directly opposed in a second, opposite axial direction by the plate portion 78A of the separating member 78. The filter 62 is radially captured by at least one of the insulating member 84 and the separating member 78 such that movement in any radial direction is opposed. In the embodiment illustrated, radial movement of the filter 62 within the filter chamber 22 is directly opposed by the circumferential flange 92 of the insulating member 84.

Figure 1A:
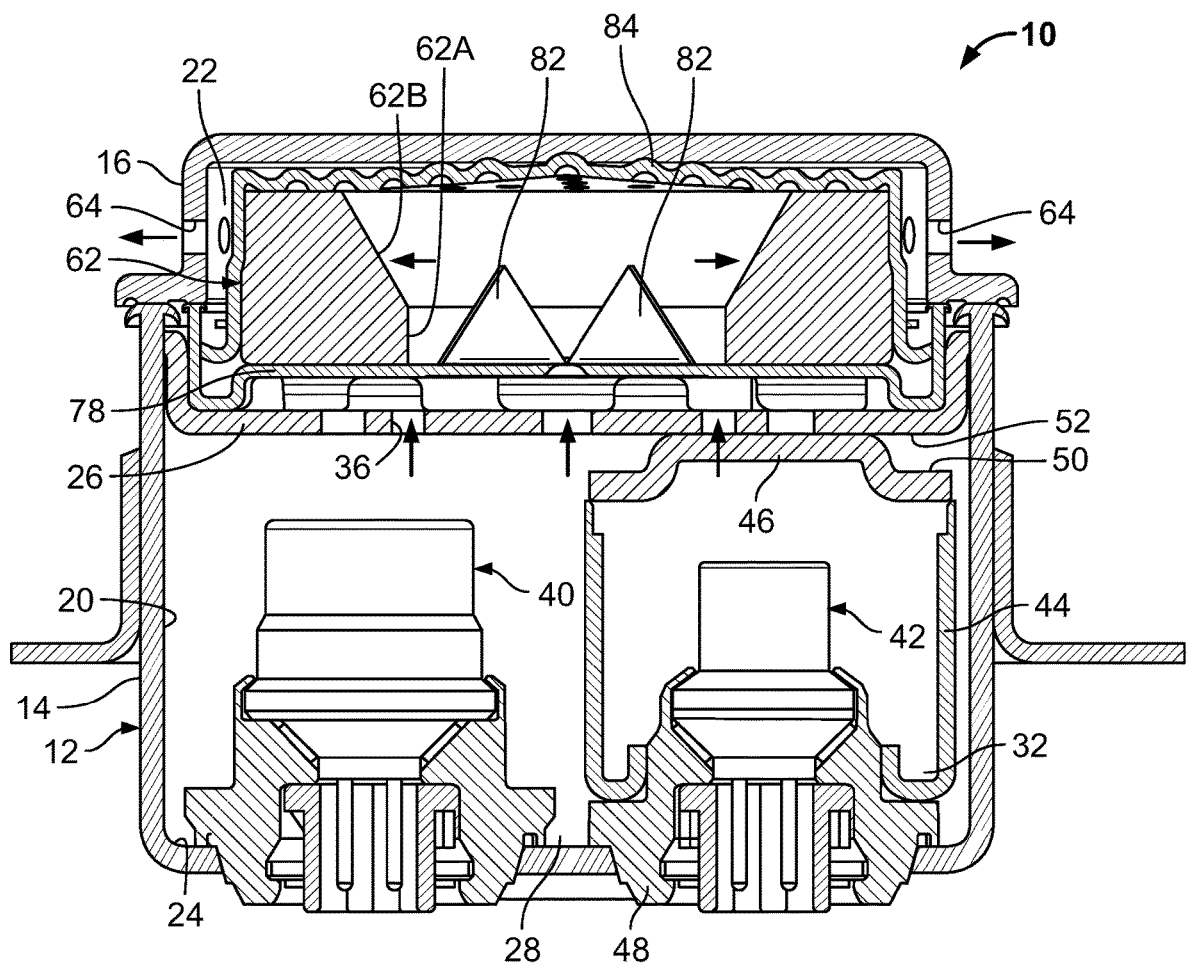
FIG. 1A is a cross-sectional view of the inflator of the present teachings similar to FIG. 1, the inflator shown after activation.
Figure 2:
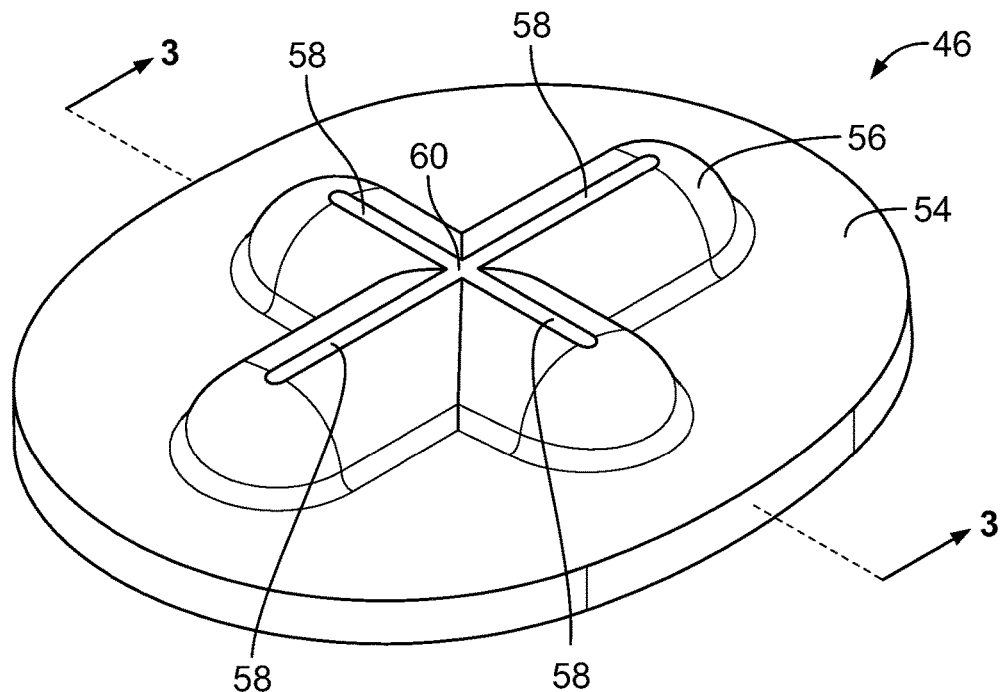
FIG. 2 is a perspective view of a lid of a second stage ignitor device in accordance with the present teachings.
Figure 3:
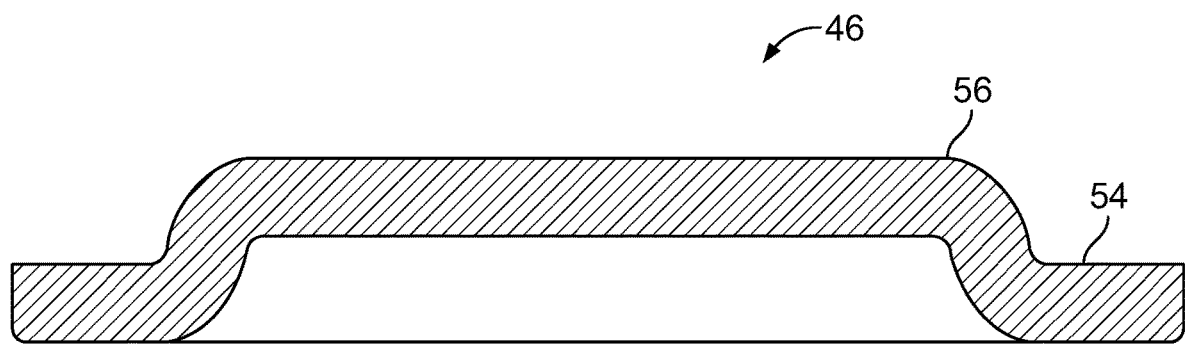
FIG. 3 is a cross-sectional view taken along the line 3-3 of FIG. 2.
Figure 4:
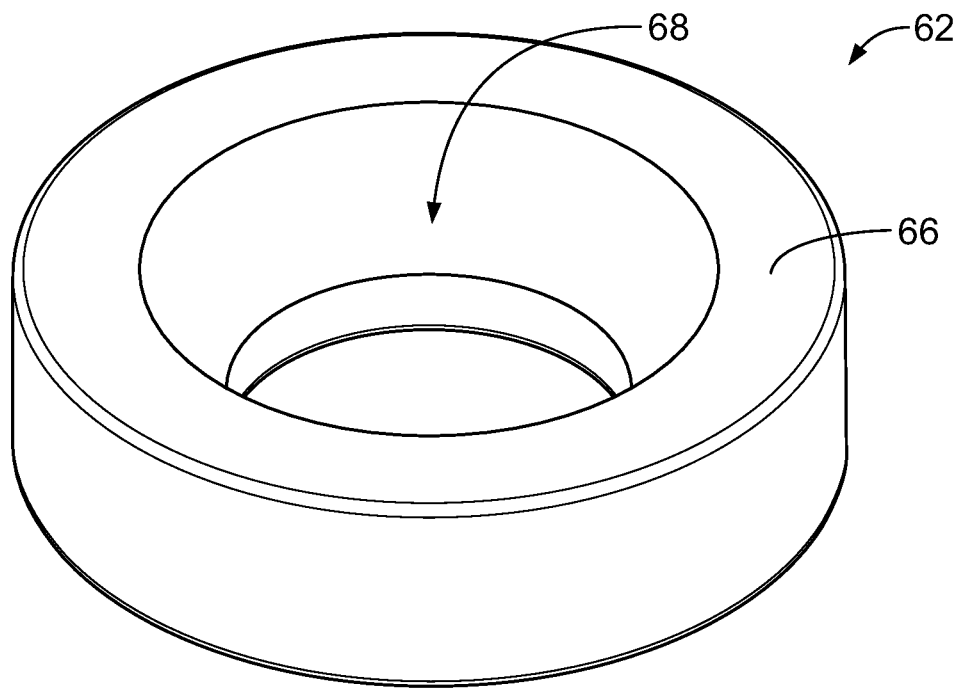
FIG. 4 is a simplified perspective view of a filter of the inflator of the present teachings.
Figure 5:
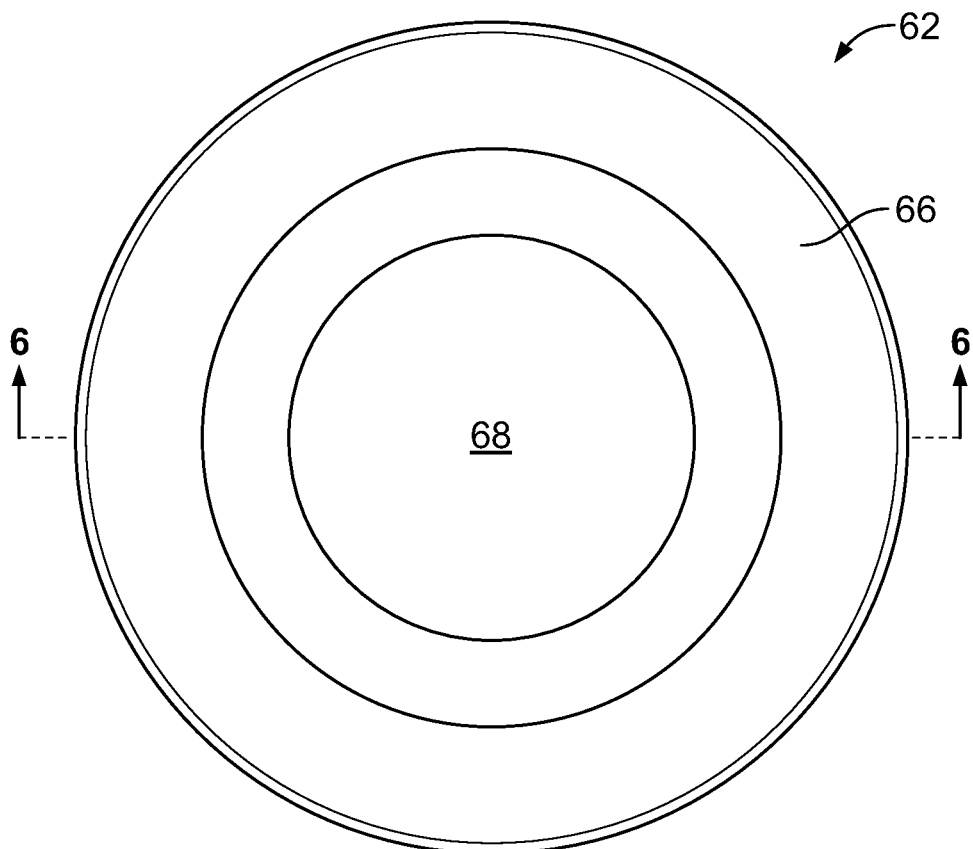
FIG. 5 is a top view of the filter of FIG. 4.
Figure 6:
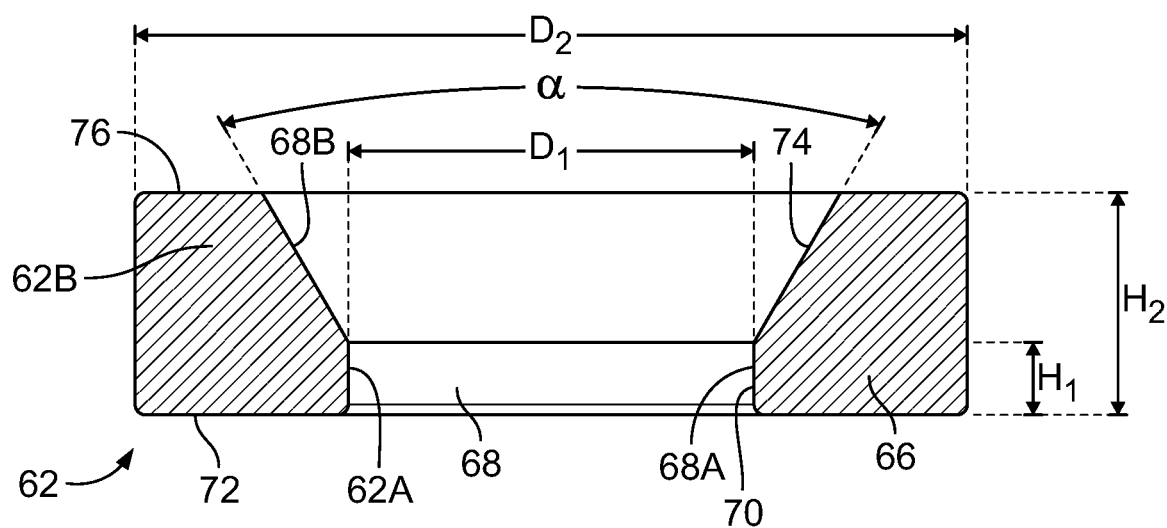
FIG. 6 is a cross-sectional view taken along the line 6-6 of FIG. 5.

With particular reference to the cross-sectional views of FIGS. 1 and 2, operation of the inflator 10 of the present teachings will be described. Flow of combustion gases is represented in FIG. 1A with arrows. It will be understood, however, that the arrows included in FIG. 1A identify the primary flow of combustion gases through the inflator 10 in a simplified manner.

Upon activation of the inflator 10, the first gas generant material 30 begins to ignite and produce inflation gases which pressurize the first portion 28 of the combustion chamber 24. The increased pressure within the first portion 28 of the combustion chamber 24 open the weakened zone 80 of the plate portion 78A of the separating member 78 causing the petals 82 to extend into the filter chamber 22. More specifically, the petals 82 of the plate portion 78A extend into the opening 68 of the filter 62. As shown in FIG. 1A, the petals 82 continue to open until they are radially opposed by the first portion 62A of the filter 62 at the first axially extending portion 68A of the opening 68. As such, the petals 82 are radially spaced from the second portion 62B of the filter 62 at the second axially extending portion 68B of the opening 68 for unimpeded flow of combustion gases in a radial direction. The combustion gases from the first gas generant material 30 pass radially through the filter 62 and are exhausted through the radially extending ports 64. Given the lower density of the filter 62 at the first portion 62A, flow of the combustion gases radially passes not only through the second portion 62B of the filter 62 but also through the first portion 62A. It will be appreciated that the reduced diameter portion of the opening 68 of the filter 62 services to block movement of the petals 82 and thereby reduces variability in performance of the inflator 10.

When the second ignition device 42 is activated, the second gas generant material 34 is activated to produce a second source of inflation gases. Upon activation of the second gas generant material 34, the second source of combustion gases pressurize the second portion 32 of the combustion chamber 24. The increased pressure within the second portion 32 of the combustion chamber 24 displaces the lid 46 from the closed position to the open position. A flow path is maintained between the lid 46 and the gas generant retaining wall 26. Again, it will be understood that this flow path maintained between the lid 46 and the gas generant retaining wall 26 is not specifically represented by arrows in FIG. 1A. It will be further understood, however, that this flow path even further reduces variability in performance of the inflator 10. The combustion gases from the second gas generant material 34 similarly pass through the openings 36 in the gas generant retaining wall, through the opening in the plate portion 78A of the separating member 78, axially into the opening 68 of the filter 62, radially through the filter 62 and out the ports 64.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. An inflator for generating inflation gases for a safety device, the inflator comprising:
    a housing having an internal cavity including a combustion chamber and a filter chamber;
    a filter disposed in the filter chamber;
    a separating member disposed in the housing on a first axial side of the filter and separating the filter chamber from the combustion chamber;
    an insulating member disposed in the filter chamber on a second axial side of the filter, the second axial side being opposite the first axial side,
    wherein the separating member is coupled to the insulating member.

2. The inflator of claim 1, wherein the separating member includes a plate portion having a weakened zone which opens in response to an increase in pressure within the combustion chamber.

3. The inflator of claim 2, wherein the weakened zone opens in response to the increase in pressure within the combustion chamber to form a plurality of petals axially extending into the filter chamber.

4. The inflator of claim 3, wherein the filter includes an axially extending opening and the plurality of petals axially extend into the axially extending opening.

5. The inflator of claim 1, wherein the insulating member is radially and axially captured by the separating member.

6. The inflator of claim 5, wherein the insulating member and the separating member are press-fit together.

7. The inflator of claim 1, wherein the insulating member includes a plurality of engagement elements engaging the separating member.

8. The inflator of claim 7, wherein the plurality of engagement elements are hook shaped engagement elements press-fit to the separating member.

9. The inflator of claim 1, wherein the filter is axially captured between the insulating member and the separating member.

10. The inflator of claim 7, wherein the filter is radially captured by at least one of the insulating member and the separating member.

11. An inflator for generating inflation gases for a safety device, the inflator comprising:
    a housing having an internal cavity including a combustion chamber and a filter chamber;
    a filter disposed in the filter chamber, the filter including an axially extending opening;
    a separating member disposed in the housing on a first axial side of the filter and separating the filter chamber from the combustion chamber;
    an insulating member disposed on the filter chamber on a second axial side of the filter, the second axial side being opposite the first axial side,
    wherein the insulating member is radially and axially captured by the separating member.

12. The inflator of claim 11, wherein the filter is axially captured between the insulating member and the separating member such that movement of the filter within the filter chamber is directly opposed in a first axial direction by the the insulating member and directly opposed in a second, opposite axial direction by the separating member.

13. The inflator of claim 11, wherein the filter radially captured by at least one of the insulating member and the separating member such that movement in any radial direction is directly opposed by at least one of the separating member and the insulating member.

14. The inflator of claim 13, wherein radial movement of the filter within the filter chamber is directly opposed by the insulating member.

15. The inflator of claim 12, wherein at least one of the insulating member and the separating member includes a plurality of engagement elements engaging the other of the insulating member and the separating member.

16. The inflator of claim 15, wherein the insulating member includes the plurality of engagement elements.

17. The inflator of claim 14, wherein the engagement elements are hook shaped engagement elements.

18. The inflator of claim 10, wherein the separating member includes a plate portion and a circumferentially extending flange.

19. The inflator of claim 18, wherein the plate portion has a weakened zone which opens in response to an increase in pressure within the combustion chamber.

20. The inflator of claim 17, wherein the insulating member includes a circumferential flange axially extending from a plate portion, the hook shaped engagement elements axially extending from the circumferential flange.

* * * * *